United States Patent
Kamasuka

(10) Patent No.: US 9,288,353 B2
(45) Date of Patent: Mar. 15, 2016

(54) SYSTEM AND METHOD FOR RESETTING A COUNTER ASSOCIATED WITH A COMPONENT OF AN IMAGE PROCESSING DEVICE

(71) Applicants: Canon Information and Imaging Solutions, Inc., Melville, NY (US); Canon U.S.A., Inc., Melville, NY (US)

(72) Inventor: Atsushi Kamasuka, New Hyde Park, NY (US)

(73) Assignees: Canon Information and Imaging Solutions, Inc., Melville, NY (US); Canon U.S.A., Inc., Melville, NY (US)

( * ) Notice: Subject to any disclaimer, the term of this patent is extended or adjusted under 35 U.S.C. 154(b) by 0 days.

(21) Appl. No.: 13/871,949

(22) Filed: Apr. 26, 2013

(65) Prior Publication Data

US 2014/0320890 A1    Oct. 30, 2014

(51) Int. Cl.
 G06F 3/12    (2006.01)
 H04N 1/00    (2006.01)

(52) U.S. Cl.
 CPC ....... H04N 1/00824 (2013.01); H04N 1/00472 (2013.01); H04N 1/00477 (2013.01); H04N 1/00832 (2013.01)

(58) Field of Classification Search
 None
 See application file for complete search history.

(56) References Cited

U.S. PATENT DOCUMENTS

| | | | |
|---|---|---|---|
| 4,860,052 A | 8/1989 | Ito et al. | |
| 5,021,828 A | 6/1991 | Yamaguchi et al. | |
| 5,066,978 A | 11/1991 | Watarai et al. | |
| 5,546,163 A | 8/1996 | Asai et al. | |
| 5,850,583 A | 12/1998 | Song et al. | |
| 5,877,692 A | 3/1999 | Watanabe et al. | |
| 5,893,005 A | 4/1999 | Ogura | |
| 5,903,285 A * | 5/1999 | Ju et al. | 347/5 |
| 6,108,499 A | 8/2000 | Cernusak | |
| 6,967,733 B1 | 11/2005 | Minowa | |

(Continued)

FOREIGN PATENT DOCUMENTS

EP    2239141 A1    10/2010

OTHER PUBLICATIONS

Lexmark: C734 and C736 Series Maintenance Guide, May 2009, pp. 1-18.

(Continued)

*Primary Examiner* — John Wallace
(74) *Attorney, Agent, or Firm* — Canon U.S.A., Inc. IP Division

(57) ABSTRACT

Embodiments of the invention include receiving information indicating a component of an image processing device has been installed on the image processing device. Status information associated with the component is stored, the status information indicating the component has been installed on the image processing device. Information is received which indicates an operation performed on the image processing device is completed. In response to receiving the information indicating the operation performed on the image processing device is completed, the component is identified based on the status information. A counter associated with the component is identified and it is determined whether the counter has been reset. In response to determining that the counter has not been reset, an interface element is presented in a graphical user interface on a display of the image processing device, the interface element enabling a user to reset the counter by selecting the interface element.

20 Claims, 8 Drawing Sheets

(56) References Cited

U.S. PATENT DOCUMENTS

| | | | |
|---|---|---|---|
| 7,440,706 B2 | 10/2008 | Moriyama et al. | |
| 7,650,085 B2 | 1/2010 | Kehoe et al. | |
| 7,734,200 B2 | 6/2010 | Sugiyama et al. | |
| 7,734,209 B2 | 6/2010 | Pathak et al. | |
| 7,949,263 B2 | 5/2011 | Nakamura | |
| 8,059,974 B2 | 11/2011 | Yamaguchi | |
| 8,099,332 B2 | 1/2012 | Lemay et al. | |
| 8,312,324 B2 | 11/2012 | Foley et al. | |
| 8,326,161 B2 | 12/2012 | Ikeno | |
| 2002/0016780 A1* | 2/2002 | Shah | 705/410 |
| 2003/0110412 A1 | 6/2003 | Neville | |
| 2003/0210426 A1* | 11/2003 | Kai | 358/1.15 |
| 2007/0171457 A1 | 7/2007 | Murahashi et al. | |
| 2007/0180159 A1 | 8/2007 | Takahashi | |
| 2009/0187900 A1 | 7/2009 | Nakamoto | |
| 2009/0324260 A1* | 12/2009 | Andou | 399/13 |
| 2010/0198728 A1* | 8/2010 | Aabye et al. | 705/44 |
| 2010/0272450 A1 | 10/2010 | Brown et al. | |
| 2011/0149329 A1* | 6/2011 | Moro et al. | 358/1.13 |
| 2011/0216359 A1 | 9/2011 | Kamisuwa et al. | |
| 2011/0293298 A1 | 12/2011 | Doi | |
| 2014/0025759 A1 | 1/2014 | Miller | |

OTHER PUBLICATIONS

Clearing the Maintenance Count and Service Message: HP LaserJets (URL: http://www.printertechs.com/printer- troubleshooting/clearing-maintenance-count), pp. 1-3.

* cited by examiner

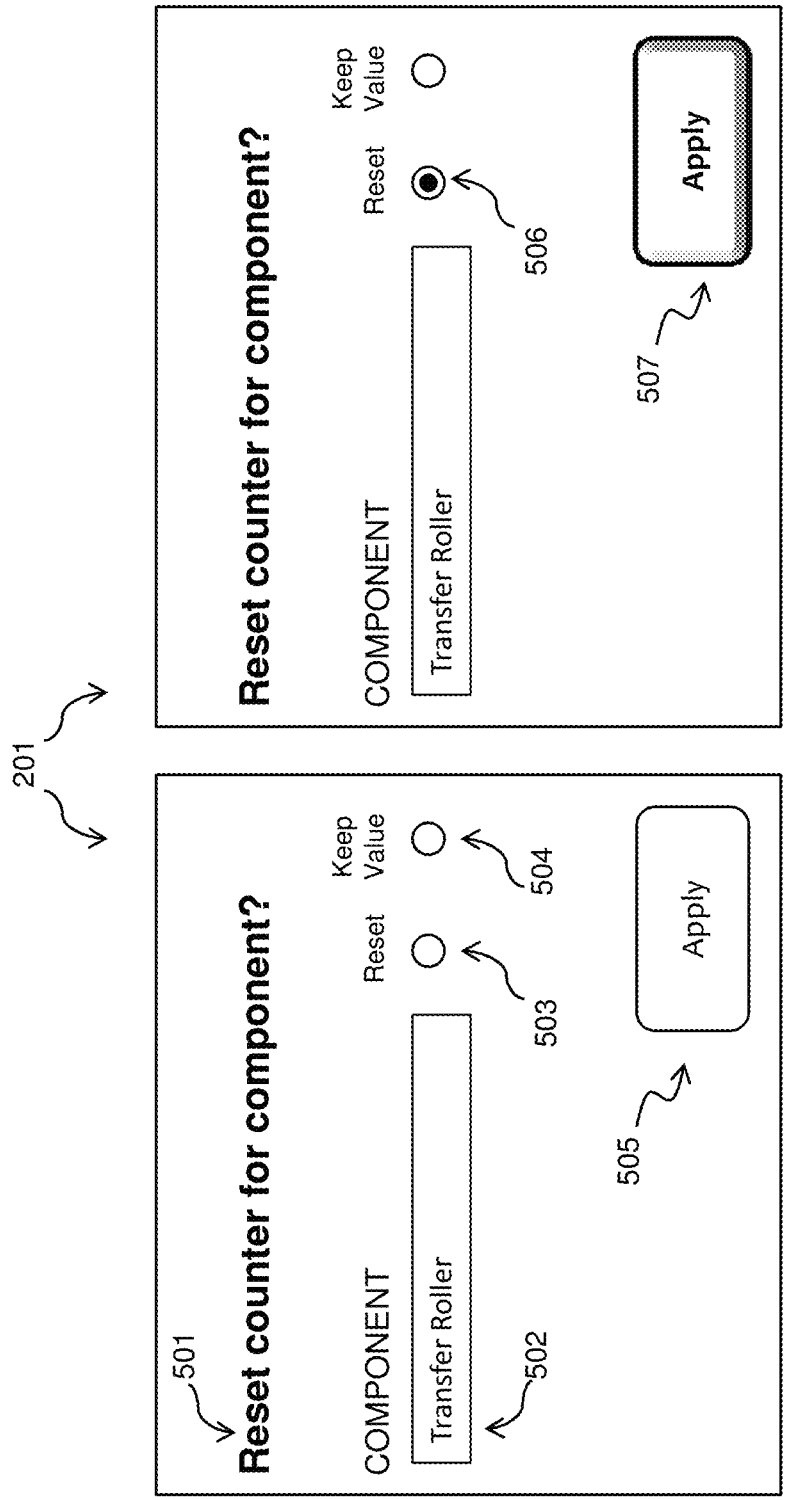

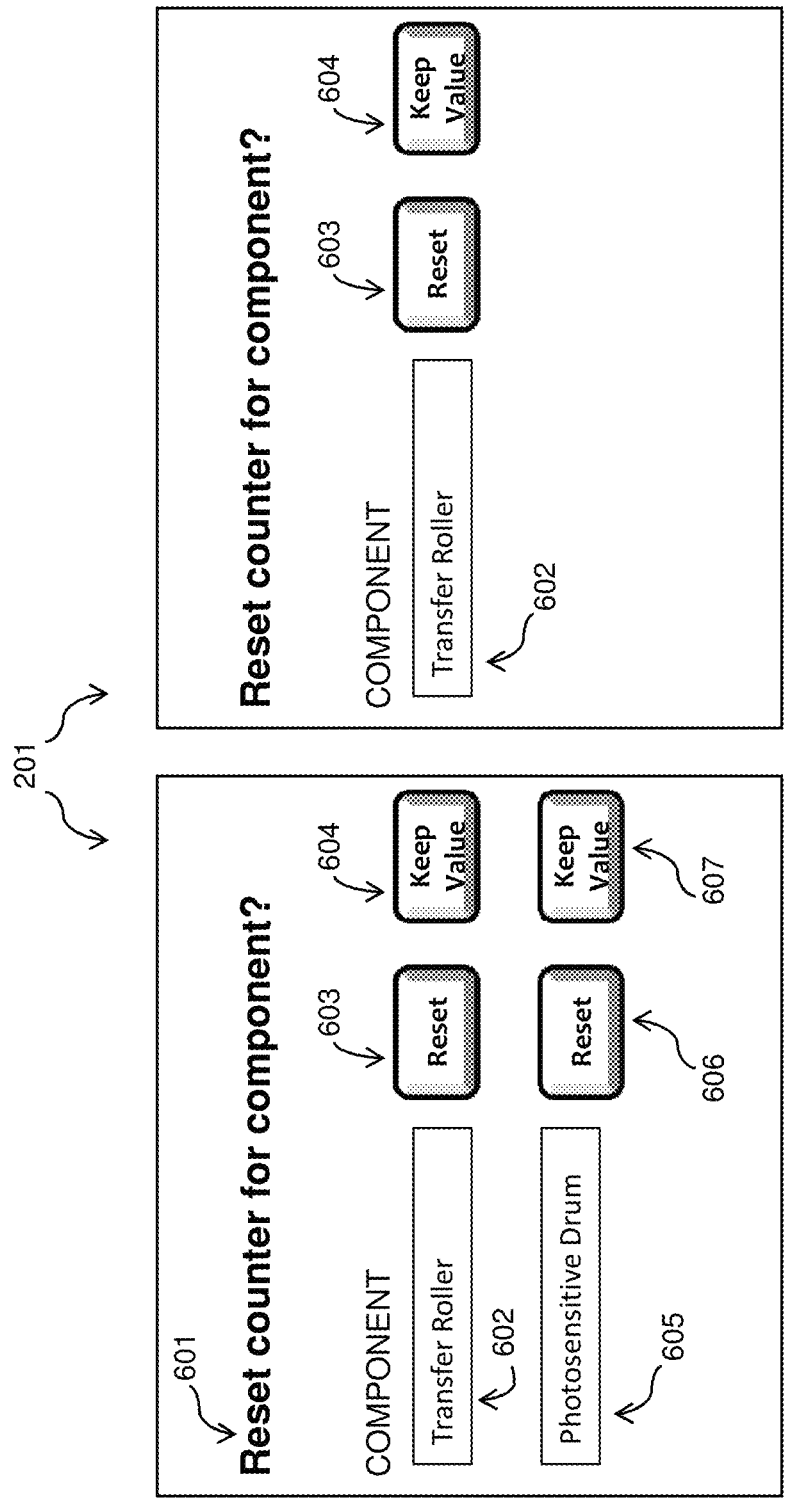

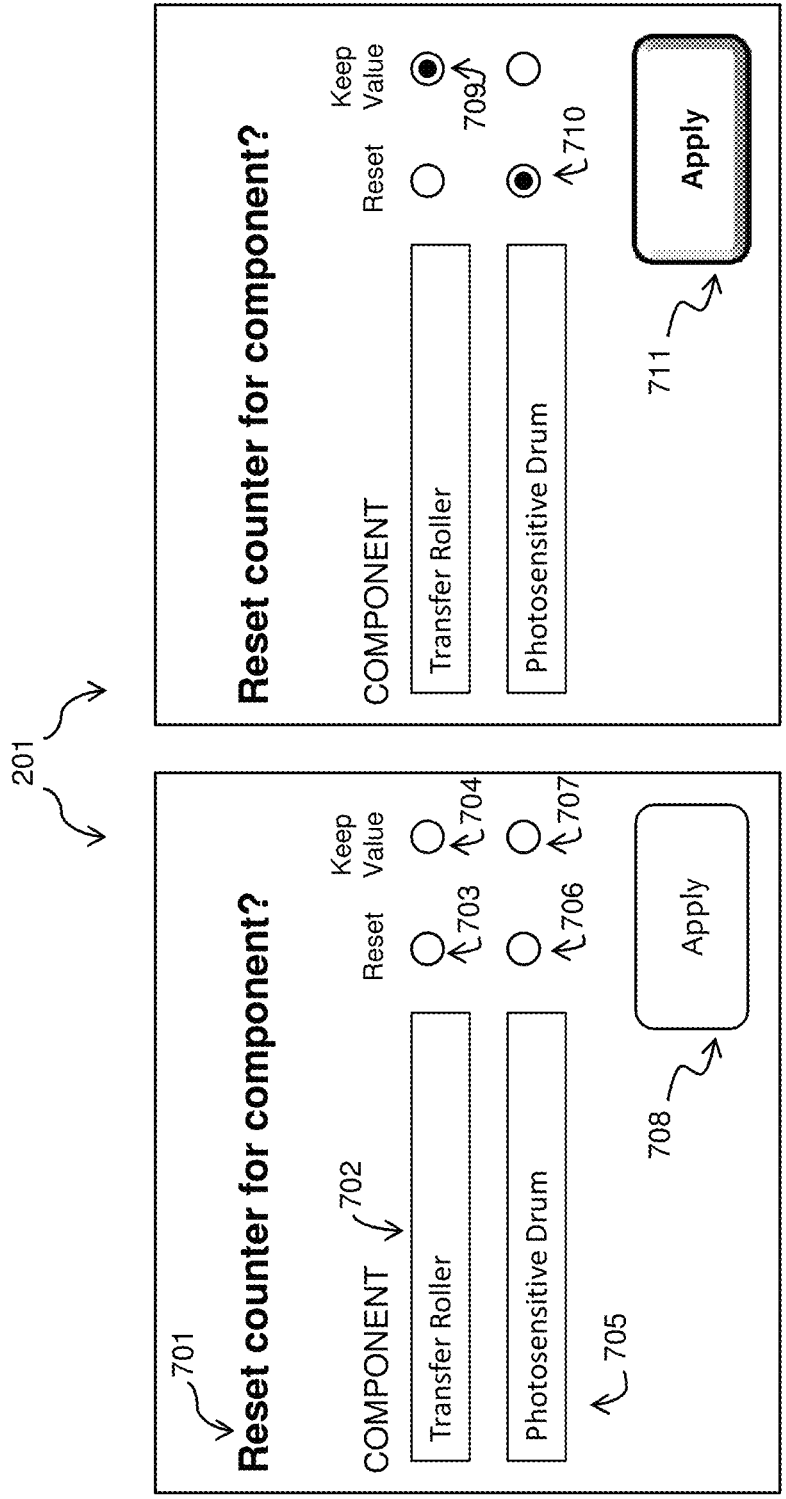

SYSTEM AND METHOD FOR RESETTING A COUNTER ASSOCIATED WITH A COMPONENT OF AN IMAGE PROCESSING DEVICE

BACKGROUND OF THE INVENTION

1. Field of the Invention

The present invention relates generally to an image processing device, and more particularly to a system and method for resetting a counter associated with a component of an image processing device.

2. Description of the Related Art

Modern image processing devices, such as multifunction peripherals, printers, copiers, or other devices, include various components. Commonly, an image processing device includes counters associated with respective components of the image processing device. Counters may be used for monitoring usage of the image processing device and scheduling maintenance. A counter may store a value representing the number of times the component associated with the counter has operated. During maintenance, if the component is replaced, a counter associated with the component may need to be reset to an initial value. Failure to reset the counter may result in an inaccurate counter which may inhibit effective monitoring and maintenance scheduling for the image processing device.

In conventional systems, a counter may be reset, for example, by navigating to the proper menu for resetting the particular counter and then resetting the counter. When using such a system, the user must know the proper menu and how to locate it or learn this information by, for example, utilizing a service manual. Moreover, if multiple counters need to be reset, a user may need to navigate to the proper menus associated with the respective counters. Thus, the user may need to know or obtain information about each counter to be reset and then manually navigate to the respective proper menus to reset the counters.

BRIEF SUMMARY OF THE INVENTION

Methods, systems, and computer-readable media for resetting a counter associated with a component of an image processing device are disclosed.

Some embodiments of the invention include receiving information indicating a component of an image processing device has been installed on the image processing device. Status information associated with the component is stored, the status information indicating the component has been installed on the image processing device. Information is received which indicates an operation performed on the image processing device is completed. In response to receiving the information indicating the operation performed on the image processing device is completed, the component is identified based on the status information. A counter associated with the component is identified and it is determined whether the counter has been reset. In response to determining that the counter has not been reset, an interface element is presented in a graphical user interface on a display of the image processing device, the interface element enabling a user to reset the counter by selecting the interface element.

Further features of the present invention will become apparent from the following description of exemplary embodiments with reference to the attached drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIGS. 5A and 5B illustrate an example graphical user interface on a display of an image processing device.

FIGS. 6A and 6B illustrate an example graphical user interface on a display of an image processing device.

FIGS. 7A and 7B illustrate an example graphical user interface on a display of an image processing device.

DETAILED DESCRIPTION OF THE INVENTION

Figure 1:
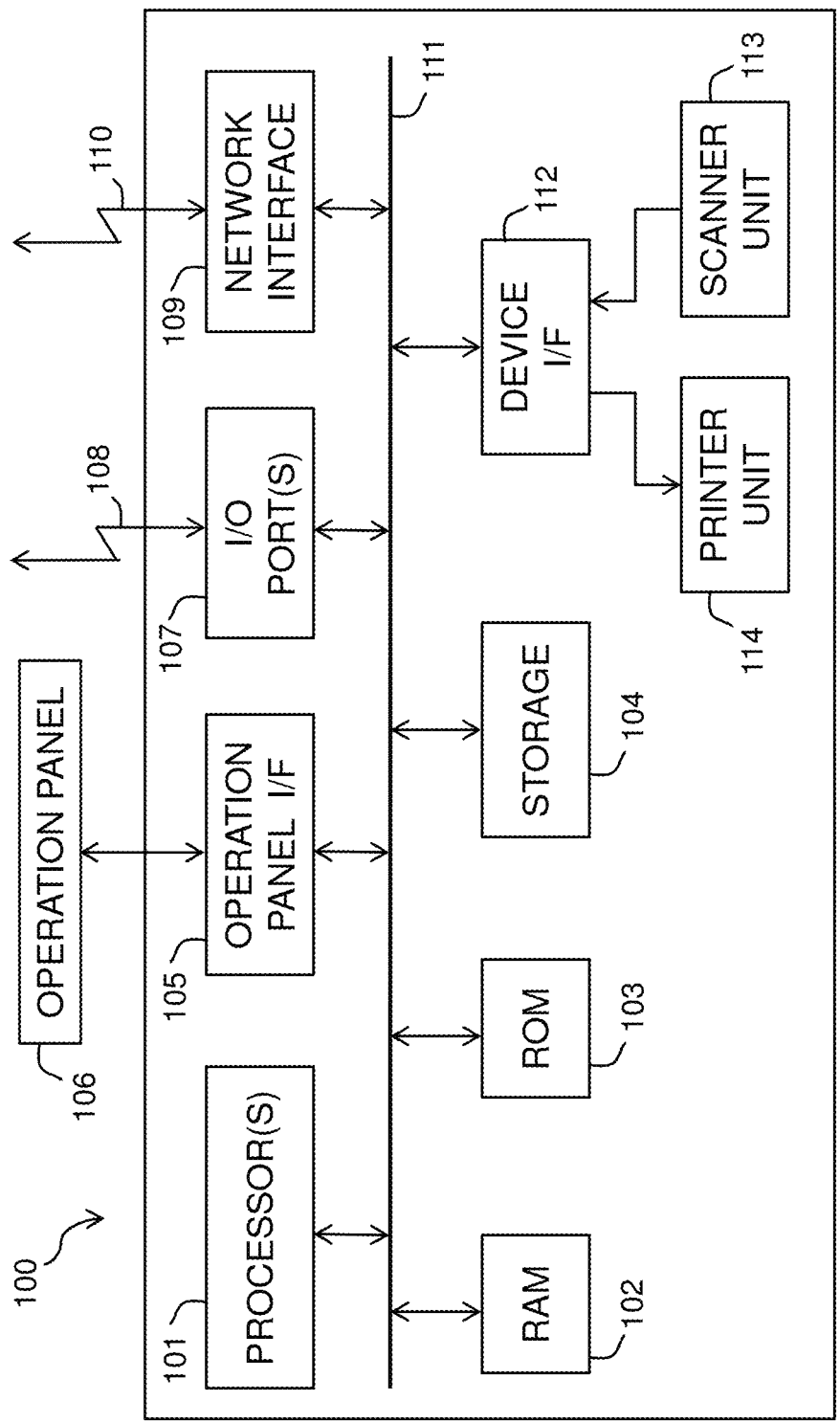
FIG. 1 illustrates an example image processing device.

Embodiments of the present invention are described with reference to the drawings. FIG. 1 illustrates an example image processing device 100. The image processing device 100 of FIG. 1 is a multifunction peripheral having printing, scanning, copying, and other functions. However, it will be understood that various other implementations of an image processing device are within the scope of the present invention. For example, various components, modules, functions, or configurations of the image processing device 100 of FIG. 1 could be combined, deleted, or modified to form further implementations. Further by way of example, in some embodiments, other devices (for example, a printer) or computing systems (for example, a computer connected to a printer) may be implemented as the image processing device.

In some embodiments, the image processing device 100 performs one or more steps of one or more methods described or illustrated herein. In some embodiments, the image processing device 100 provides functionality described or illustrated herein. In some embodiments, software running on the image processing device 100 performs one or more steps of one or more methods described or illustrated herein or provides functionality described or illustrated herein. Particular embodiments include one or more portions of the image processing device 100.

The image processing device 100 includes one or more processor(s) 101. The processor(s) 101 include a central processing unit (CPU) that performs overall control functions for the image processing device 100. The CPU uses a random access memory (RAM) 102 as a work area while executing instructions. The CPU executes instructions of various programs stored in one or more memory devices. For example, the CPU executes programs stored in a read only memory (ROM) 103 and in storage 104.

In some embodiments, the processor(s) 101 include one or more processors in addition to the CPU. By way of example, the processor(s) 101 may include one or more general-purpose microprocessor(s), application-specific microprocessor(s), and/or special purpose microprocessor(s). Additionally, in some embodiments the processor(s) 101 may include one or more internal caches for data or instructions.

The processor(s) 101 provide the processing capability required to execute an operating system, application programs, and various other functions provided on the image processing device 100. The processor(s) 101 perform or cause components of the image processing device 100 to perform various operations and processes described herein, in accordance with instructions stored in one or more memory devices.

The RAM 102 is used as a work area when the processor(s) 101 execute various instructions, such as those making up computer programs stored in the ROM 103 and/or the storage 104. The RAM 102 may be used as a temporary storage area for various data, including input image data. The RAM 102 may be used as a cache memory. In some embodiments, the RAM may be dynamic RAM (DRAM) or static RAM (SRAM).

The ROM 103 stores data and programs having computer-executable instructions for execution by the processor(s) 101. In some embodiments, the ROM 103 is a boot ROM, storing instructions for the booting process. In some embodiments, the ROM 103 may be flash memory.

The storage 104 stores application data, program modules and other information. One or more program modules stored in the storage 104 may be configured to cause various operations and processes described herein to be executed. For example, in some embodiments, the storage 104 stores instructions that, when executed by the processor(s) 101, cause the processor(s) 101 to perform one or more steps of one or more methods described or illustrated herein.

The storage 104 also stores other programs and data to be processed. For example, the storage 104 stores an operating system including programs and data for managing hardware and software components of the image processing device 100. Applications on the image processing device 100 may utilize the operating system to perform various operations. The storage 104 may further store other programs and/or drivers that enable various functions of the image processing device 100, graphical user interface (GUI) functions, and/or processor functions. The storage 104 may also store data files including, for example, image data, user data, configuration information, GUI components, such as graphical elements or templates, or other data required by the image processing device 100.

In some embodiments, the storage 104 stores counter information. For example, an area of memory in the storage 104 may be used as a counter associated with a particular component of the image processing device 100. In some embodiments, the counter stores a single value representing the number of times the component associated with the counter has operated. The stored value may be incremented by one. For example, the value may be incremented by one when the particular component associated with the counter is operated. The stored value may be reset to zero. For example, the value may be reset to zero when the component associated with the counter is replaced by a new component. In some embodiments, multiple counters are provided, each counter associated with a respective particular component of the image processing device 100.

By way of example and not by way of limitation, the storage 104 may include a hard disk drive, a floppy disk drive, flash memory, an optical disc, a magneto-optical disc, magnetic tape, or a Universal Serial Bus (USB) drive or a combination of two or more of these. In some embodiments, the storage 104 is a fixed medium. In some embodiments, the storage 104 is a removable medium. In some embodiments, the storage 104 is internal to the image processing device 100. In some embodiments, the storage 104 is external to the image processing device 100. In some embodiments, the storage 104 is non-volatile, solid-state memory. In some embodiments, the storage 104 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. The storage 104 may include one or more memory devices.

An operation panel interface 105 provides output signals to and receives input signals from an operation panel 106. Regarding the output signals, the operation panel interface 105 provides GUI data to the operation panel 106 for display on a liquid crystal display (LCD). Regarding the input signals, the operation panel interface 105 receives input signals based on user inputs at the operation panel 106 and relays the input signals to the processor(s) 101. The operation panel interface 105 and the operation panel 106 are described further with reference to FIG. 2.

Figure 2:
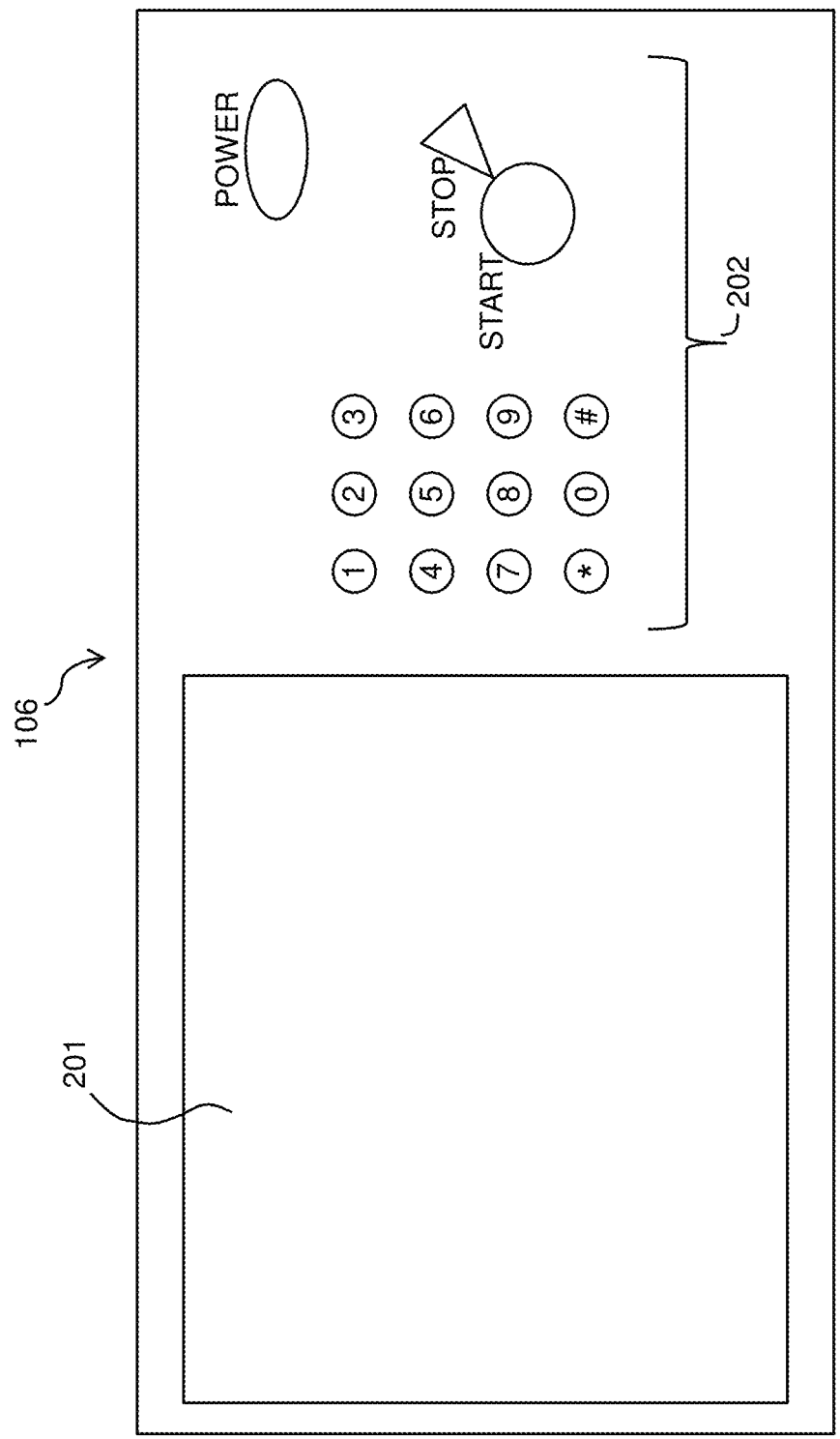
FIG. 2 illustrates an example implementation of an operation panel of an image processing device.

FIG. 2 illustrates an example implementation of the operation panel 106 of FIG. 1. The operation panel 106 includes a display 201 and a hard key panel 202. The display 201 includes the LCD described above and a backlight which illuminates the LCD.

Regarding outputting signals to the display 201, the processor(s) 101 rasterize an image to be displayed on the display 201, and transfer the rasterized image to the display 201 via the operation panel interface 105. The display 201 then displays the image, such as a GUI. The processor(s) 101 are further operable to cause other types of images, such as images of scanned physical documents, to be displayed on the display 201. The processor(s) 101 may also turn on/off the backlight via the operation panel interface 105.

Regarding receiving input signals from the operation panel 106, in some embodiments, the display 201 further includes a touch sensitive element operable to receive user inputs or commands based on the touching of interface elements presented in a GUI on the display 201. The interface element may be a graphical object displayed on the display 201. A user may touch the touch sensitive display 201 with a finger, stylus, or other tool to provide a user input. When the user touches a specific region on the touch sensitive display 201, the processor(s) 101 are notified via the operation panel interface 105 of the coordinates of the region. The processor(s) 101 determine the content of a user input based on the notified coordinates and the display contents on the display 201, and execute processing based on them.

User inputs may also be provided via the hard key panel 202. When the user presses a hard key of the hard key panel 202, the processor(s) 101 are notified via the operation panel interface 105 of information indicative of the user input. The processor(s) 101 execute processing based on the notification. While a particular hard key panel 202 is illustrated and described, other implementations may be utilized. For example, hard keys or buttons may be arranged differently. Further by way of example, input structures on the hard key panel 202 may exist in various forms including buttons, keys, switches, control pads, and so forth, depending on specific implementation requirements.

In the manner described above, a user can provide user inputs via the hard key panel 202 and/or the touch sensitive display 201 to control the image processing device 100 via the operation panel 106. Moreover, the image processing device 100 can output information to the user and issue requests by presenting images on the display 201.

Referring again to FIG. 1, the image processing device 100 includes one or more input/output (I/O) port(s) 107. The I/O port(s) 107 may include any suitable interface type such as a universal serial bus (USB) port, FireWire port (IEEE-1394), serial port, parallel port, or AC/DC power connection port. The I/O port(s) 107 enable one or more external device(s) 108 to communicate with the image processing device 100 when the external device(s) 108 is/are connected to the I/O port(s) 107. Examples of external devices 108 include a near field communication (NFC) interface (for example, an NFC reader), a smart card reader, radio-frequency identification (RFID) reader, device for detecting biometric information, a keyboard, keypad, sensor(s), a combination of two or more of these, or other suitable device.

A network interface 109 includes hardware, software, or both providing one or more interfaces for communication (such as, for example, packet-based communication) between the image processing device 100 and one or more other computing systems or one or more networks 110. As an example and not by way of limitation, the network interface 109 may include a network interface card (NIC) or a network controller for communicating with an Ethernet or other wire-based network or a wireless NIC (WNIC) or wireless adapter for communicating with a wireless network, such as a WI-FI network. This disclosure contemplates any suitable network 110 and any suitable network interface 109 for it. As an example and not by way of limitation, the image processing device 100 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks 110 may be wired or wireless. As an example, the image processing device 100 may communicate with a wireless PAN (WPAN) (such as, for example, a BLUETOOTH WPAN), a WI-FI network, a WI-MAX network, or other suitable wireless network or a combination of two or more of these. The image processing device 100 may include any suitable network interface 109 for any of these networks 110, where appropriate.

A system bus 111 interconnects various components of the image processing device 100 thereby enabling the transmission of data and execution of various processes. The system bus 111 may include one or more types of bus structures including a memory bus or memory controller, a peripheral bus, and a local bus using any of a variety of bus architectures.

The device interface 112 is connected to the scanner unit 113 and to the printer unit 114. The device interface 112 performs synchronous/asynchronous conversion of image data.

The scanner unit 113 includes a light source and an image sensor. The scanner unit 113 may include a glass platen and/or an automatic document feeder (ADF). In operation, the light source illuminates a physical document positioned on the glass platen or fed by the ADF. Light reflected by the physical document reaches the image sensor, and the image sensor converts the light into electrical signals. In some embodiments, the scanner unit 113 includes an optical system (for example, mirrors, lens) that directs the light to the image sensor. After the image sensor generates the electrical signals, an analog-to-digital converter converts the electrical signals to digital image data representing the scanned physical document. The scanner unit 113 then outputs the digital image data to one or more other components of the image processing device 100 via the device interface 112.

In some embodiments, the scanner unit 113 includes one or more sensors to detect component removal and/or component installation. The scanner unit 113 includes various components for providing the functionality of the scanner unit 113. For example, the scanner unit 113 may include one or more motors, gears, transfer belts, transfer rollers, or other components that operate during a scan operation. During maintenance, one or more of the components of the scanner unit 113 may be detached from and/or attached to the image processing device 100. For example, a component may be removed for repair and/or cleaning and then reinstalled on the image processing device 100. Further by way of example, a component may be removed and then a replacement component installed on the image processing device 100. In some embodiments, sensors associated with the respective components of the scanner unit 113 are provided to detect the component removal and/or the component installation. The one or more sensors may include one or more optical sensors, one or more mechanical sensors, one or more electrical sensors, or a combination of two or more of these. The one or more sensors may be coupled to the processor(s) 101 and send output signals to the processor(s) 101.

The printer unit 114 is an image output device for printing on a sheet an image corresponding to image data. In response to a print command received at the image processing device 100, the printer unit 114 receives image data via the device interface 112 and outputs to a sheet an image corresponding to the image data.

In some embodiments, the printer unit 114 includes one or more sensors to detect component removal and/or component installation. The printer unit 114 includes various components for providing the functionality of the printer unit 114. For example, the printer unit 114 may include one or more photosensitive drums, transfer belts, transfer rollers, motors, gears, or other components that operate during a print operation. During maintenance, one or more of the components of the printer unit 114 may be detached from and/or attached to the image processing device 100. For example, a component may be removed for repair and/or cleaning and then reinstalled on the image processing device 100. Further by way of example, a component may be removed and then a replacement component installed on the image processing device 100. In some embodiments, sensors associated with the respective components of the printer unit 114 are provided to detect the component removal and/or the component installation. The one or more sensors may include one or more optical sensors, one or more mechanical sensors, one or more electrical sensors, or a combination of two or more of these. The one or more sensors may be coupled to the processor(s) 101 and send output signals to the processor(s) 101.

Figure 3:
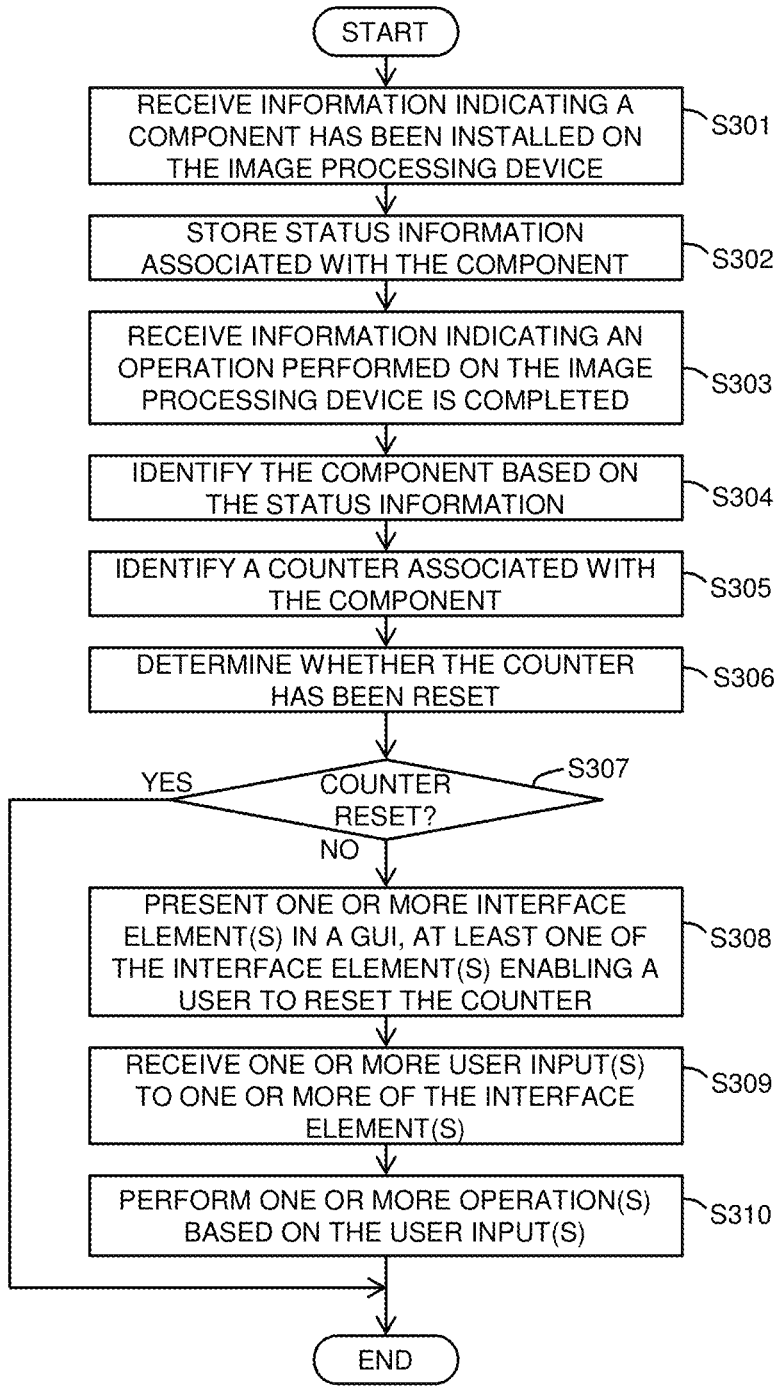
FIG. 3 illustrates an example flow of operations at an image processing device.

FIG. 3 is described with reference to the example image processing device 100 of FIG. 1. FIG. 3 illustrates an example flow of operations at the image processing device 100.

In step S301, information is received at the image processing device 100, the information indicating a component of the image processing device 100 has been installed on the image processing device 100.

In some embodiments, step S301 includes receiving information based on a sensor of the image processing device 100 detecting that the component has been installed on the image processing device 100. For example, a component of the printer unit 114 may be installed on the image processing device 100. A sensor included in the printer unit 114 detects the component installation and sends an output signal to the processor(s) 101. The output signal may include information indicating that the component has been installed on the image processing device 100. In some embodiments, the output signal sent from the sensor to the processor(s) 101 represents a logical value, where one possible value (e.g., 1) indicates the component is attached to the image processing device 100 and the other possible value (e.g., 0) indicates the component is not attached to the image processing device 100. Accordingly, in response to detecting the component installation, the sensor may send an output signal representing a value (e.g., 1) that indicates that the component has been installed on the image processing device 100. The processor(s) 101 then receive the output signal sent from sensor.

In some embodiments, step S301 includes receiving information based on one or more user inputs to the operation panel 106 of the image processing device 100. For example, a component may be installed on the image processing device 100. A user may then provide one or more user inputs to the image processing device 100 via the operation panel 106. Based on the user's interaction(s) with the operation panel 106, the processor(s) 101 determine the content of the one or more user inputs. In some embodiments, the content of the one or more user inputs includes information indicating that the component has been installed on the image processing device 100.

In some embodiments, step S301 includes receiving, from a device over the one or more networks 110, the information indicating a component has been installed on the image processing device 100. For example, a component may be installed on the image processing device 100. Then, based on one or more user inputs, a device may send the information indicating that the component has been installed on the image processing device 100. The information may include, for example, component identification information that identifies the component that was installed on the image processing device 100. The image processing device 100 then receives the information from the device via the network interface 109.

In some embodiments, at the time the information is received in step S301, the image processing device 100 is operating in an operation mode for performing component removal and component installation on the image processing device 100. The operation mode for performing component removal and component installation may be a service mode. By way of example, a service mode may be an operation mode used when maintenance work is performed on the image processing device 100. When the image processing device 100 is operating in a service mode, various features and/or operations may be available or permissible which may not be available or permissible in a different mode of operation. For example, in a service mode, features may be available for modifying settings of the image processing device 100, testing functionality of the image processing device 100, or checking the status of the image processing device 100 or a component of the image processing device 100. Moreover, in a service mode, one or more operations (for example, removal, installation, adjustment, repair, or cleaning of a component) may be performed with respect to one or more components of the image processing device 100.

In some embodiments, multiple components may be installed on the image processing device 100. Accordingly, the processing of step S301 may be performed multiple times. For example, for each component installed on the image processing device 100, information indicating the particular component has been installed may be received at the image processing device 100.

In step S302, the image processing device 100 stores status information associated with the component, the status information indicating the component has been installed on the image processing device 100. A value of the status information may represent a status of the component. In response to receiving the information indicating a component has been installed on the image processing device 100 in step S301, the image processing device 100 may store status information having a value which represents the status of the component as having been installed on the image processing device 100. In some embodiments, the image processing device 100 stores the status information as an element of a data structure, which may be any suitable data structure for organizing data. In some embodiments, step S302 includes changing the value of an element of a data structure.

In some embodiments, step S302 includes setting a flag associated with the component. The flag may be information having a value which indicates the component has been installed on the image processing device 100. In some embodiments, a flag may be set for a particular component based on a combination of signals indicating component detachment from and component attachment to the image processing device 100 has occurred.

The image processing device 100 may store the status information in memory on the image processing device 100. For example, the status information may be stored in a cache. The image processing device 100 may store the status information on a hard disk drive or other storage device. The image processing device 100 may store the status information in the storage 104 of the image processing device 100. The image processing device 100 may store the status information in a data store, such as a database.

In some embodiments, multiple components may be installed on the image processing device 100. Accordingly, the processing of step S302 may be performed multiple times. For example, for each component installed on the image processing device 100, status information indicating the particular component has been installed on the image processing device 100 may be stored.

In step S303, information is received at the image processing device 100, the information indicating an operation performed on the image processing device 100 is completed. In some embodiments, the operation performed on the image processing device 100 includes maintenance work performed with respect to one or more components of the image processing device 100. In some embodiments, the information indicating an operation performed on the image processing device 100 is completed is based on one or more user inputs provided via the operation panel 106. In some embodiments, the information indicating an operation performed on the image processing device 100 is completed is received from a device over the one or more networks 110. In some embodiments, the information indicating an operation performed on the image processing device 100 is completed is based on the status of one or more components of the image processing device 100. For example, the information indicating the operation is completed may be based on one or more components being closed (for example, a panel of the image processing device 100) or one or more components being installed.

In some embodiments, step S303 includes receiving information indicating the image processing device 100 is transitioning from an operation mode for performing component removal and component installation on the image processing device 100 to a different operation mode. The different operation mode may be the standard or default operation mode for the image processing device 100, and may be a mode of operation for utilizing features of the image processing device 100 such as printing, copying, or scanning. The operation mode for performing component removal and component installation may be a service mode such as described above with respect to step S301. The information indicating the image processing device 100 is transitioning from an operation mode for performing component removal and component installation on the image processing device 100 to a different operation mode may be based on the occurrence of an event which triggers the transition from the operation mode for performing component removal and component installation to the different operation mode. For example, the image processing device 100 may have been set to a service mode for maintenance work to be performed on the image processing device 100 and, while in service mode, an event may occur which causes the image processing device 100 to transition from the service mode to a different mode of operation. Examples of events which may cause the image processing device 100 to transition out of the service mode include but are not limited to the following: a user input for exiting the service mode is provided; a status of a component of the image processing device 100 is changed (for example, a panel of the image processing device 100 is closed); and a predetermined amount of time has elapsed without activity. In some embodiments, the information, received in step S303, indicating an operation performed on the image processing device 100 is completed is information indicating the image processing device 100 is transitioning from a service mode to a different operation mode.

In step S304, the image processing device 100 identifies the component based on the status information stored in step S302. In some embodiments, step S304 is performed in response to receiving, in step S303, the information indicating the operation performed on the image processing device 100 is completed. In some embodiments, step S304 includes reading the status information and determining that the component has been installed on the image processing device 100 based on the status information.

Multiple components may be installed on the image processing device 100. Moreover, for each of a plurality of components installed on the image processing device 100, status information indicating the particular component has been installed on the image processing device 100 may be stored. In some embodiments, in step S304, the image processing device 100 identifies multiple components based on status information associated with each respective component. For example, in response to receiving, in step S303, the information indicating the operation performed on the image processing device 100 is completed, the image processing device 100 may search for instances of status information indicating respective components have been installed on the image processing device 100. The image processing device 100 may determine that multiple components have been installed on the image processing device 100 based on the status information associated with each respective component.

In some embodiments, the status information may be a flag such as the flag described above with respect to step S302. In some embodiments, step S304 includes identifying the component based on a flag associated with the component. In some embodiments, step S304 includes identifying multiple components based on a flag associated with each respective component.

In step S305, the image processing device 100 identifies a counter associated with the component identified in step S304. In some embodiments, an area of memory in the storage 104 of the image processing device 100 is used as the counter associated with the component. Any suitable storage area in any suitable storage device may be used as a counter. In some embodiments, the image processing device 100 identifies the counter associated with the component by reading information that identifies a location of the counter. By way of example, the information that identifies the location of the counter may include an address of the storage area used as the counter.

In some embodiments, multiple components are identified in step S304. In some embodiments, in step S305, the image processing device 100 identifies multiple counters, each of the multiple counters associated with a respective one of the multiple components identified in step S304.

In step S306, the image processing device 100 determines whether the counter identified in step S305 has been reset. In some embodiments, step S306 includes obtaining a value of the counter by reading data stored in the storage area used as the counter. Based on the value of the counter, the image processing device 100 may determine whether the counter has been reset.

In some embodiments, the counter stores a single value representing the number of times the component associated with the counter has operated. The stored value may be incremented by one. For example, the value may be incremented by one when the component associated with the counter is operated. The stored value may be reset to zero. In some embodiments, the image processing device 100 determines that the counter has been reset when the value of the counter is zero. In some embodiments, the image processing device 100 determines that the counter has not been reset when the value of the counter is a value other than zero.

In some embodiments, multiple counters are identified in step S305, each of the multiple counters associated with a respective one of multiple components. In some embodiments, in step S306, the image processing device 100 determines, for each of the multiple counters, whether each respective counter has been reset.

In some embodiments, a counter associated with a component installed on the image processing device 100 may be reset before the processing of step S306 is performed. By way of example, a user may provide, via the operation panel 106, one or more user inputs for resetting the counter. The user may provide the one or more user inputs for resetting the counter while the image processing device 100 is operating in an operation mode for performing component removal and component installation on the image processing device 100. For example, the image processing device 100 may be in a service mode and the user may navigate, by interacting with a GUI, to a screen for resetting the counter and then provide an input that causes the counter to be reset.

Further by way of example, the image processing device 100 may reset the counter associated with the component in response to receiving information from a device over the one or more networks 110. The information received from the device may include information associated with the component. Examples of information associated with the component include but are not limited to the following: information that identifies the component (e.g., an identification number) and information about usage of the component (e.g., data having a value representing the number of times the component has operated). The information received from the device may include a request or a command to reset the counter associated with the component. The image processing device 100 may receive the information from the device while the image processing device 100 is operating in an operation mode for performing component removal and component installation on the image processing device 100. For example, the image processing device 100 may be in a service mode when the information is received from the device over the one or more networks 110. In some embodiments, the image processing device 100 may reset the counter based on the information that identifies the component. For example, if the component is a replacement part, the image processing device 100 may recognize that the information that identifies the component is different from information that identifies the corresponding replaced component. In some embodiments, the image processing device 100 may reset the counter based on the information about usage of the component when, for example, the information about usage of the component indicates the number of times the component has operated is zero.

Further by way of example, the image processing device 100 may reset the counter associated with the component installed on the image processing device 100 in response to receiving information from the component. For example, the component may include an integrated circuit (IC) chip that stores the information and, upon installation, the image processing device 100 may obtain the information from the component. The information received from the component may include information associated with the component. Examples of information associated with the component include but are not limited to the following: information that identifies the component (e.g., an identification number) and information about usage of the component (e.g., data having a value representing the number of times the component has operated). In some embodiments, the image processing device 100 may reset the counter based on the information that identifies the component. For example, if the component is a replacement part, the image processing device 100 may recognize that the information that identifies the component is different from information that identifies the corresponding replaced component. In some embodiments, the image processing device 100 may reset the counter based on the information about usage of the component when, for example, the information about usage of the component indicates the number of times the component has operated is zero.

In step S307, in response to determining that the counter has been reset (yes in step S307), the process ends. In some embodiments, in step S306 the image processing device 100 determines, for each one of multiple counters, whether each respective counter has been reset. In some embodiments, in step S307, in response to determining that all of the multiple counters have been reset (yes in step S307), the process ends.

On the other hand, in response to determining that the counter has not been reset (no in step S307), the process advances to step S308. In some embodiments, in step S306 the image processing device 100 determines, for each one of multiple counters, whether each respective counter has been reset. In some embodiments, in step S307, in response to determining that at least one of the multiple counters has not been reset (no in step S307), the process advances to step S308.

In step S308, the image processing device 100 presents one or more interface elements in a GUI on the display 201 of the image processing device 100, at least one of the one or more interface elements enabling a user to reset the counter by selecting the interface element. Step S308 is described further with reference to example GUI screens which may be presented on the display 201 of the image processing device 100, in accordance with various embodiments. While particular examples of a GUI are illustrated, it will be understood that various other implementations of a GUI are within the scope of the present invention. For example, various features of the illustrated examples could be modified, rearranged, or removed, or one or more features could be added without departing from the scope of the invention.

Figure 4:
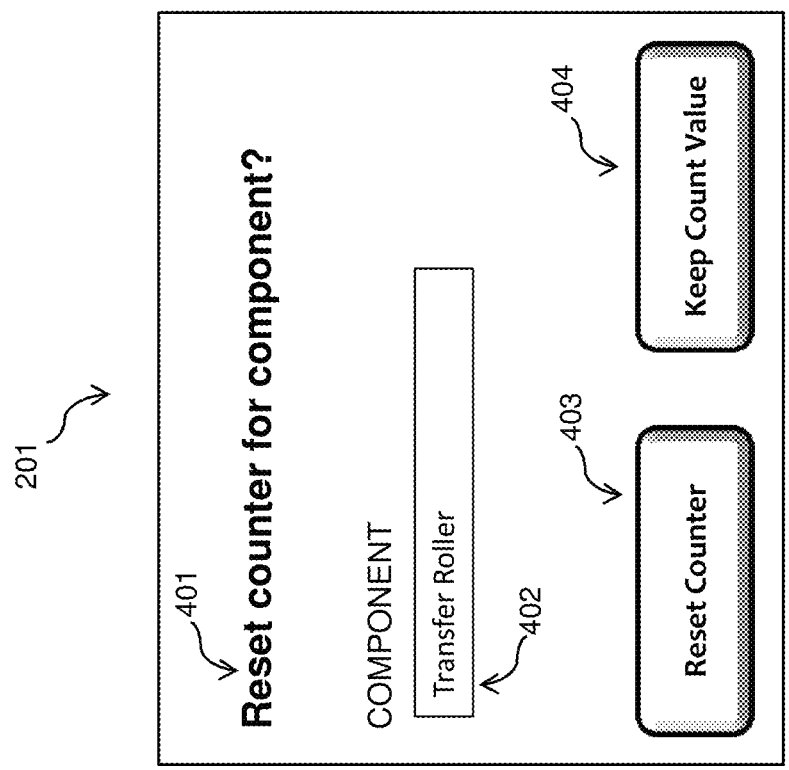
FIG. 4 illustrates an example graphical user interface on a display of an image processing device.

FIG. 4 illustrates an example GUI on the display 201 of the image processing device 100. At least a transfer roller is installed on the image processing device 100, the processing described with respect to steps S301 to S307 is performed and, in response to determining that the counter associated with the transfer roller has not been reset, the image processing device 100 presents the GUI screen shown at FIG. 4.

In FIG. 4, a message 401, component information 402, a reset button 403, and a keep-value button 404 are presented on the display 201. The message 401 is textual information to prompt a user to provide a user input. The text of the message 401 ("Reset counter for component?") is a query about whether the counter associated with the component identified in the component information 402 should be reset. The component information 402 includes textual information that identifies a component (Transfer Roller) of the image processing device 100. The reset button 403 is an interface element enabling a user to reset the counter for the Transfer Roller by selecting the reset button 403. The keep-value button 404 is an interface element enabling a user to maintain a count value associated with the counter for the Transfer Roller by selecting the keep-value button 404.

FIG. 5A illustrates another example GUI on the display 201 of the image processing device 100. At least a transfer roller is installed on the image processing device 100, the processing described with respect to steps S301 to S307 is performed and, in response to determining that the counter associated with the transfer roller has not been reset, the image processing device 100 presents the GUI screen shown at FIG. 5A.

In FIG. 5A, a message 501, component information 502, a reset radio button 503, a keep-value radio button 504, and an apply button 505 are presented on the display 201. The message 501 is textual information to prompt a user to provide user inputs. The text of the message 501 ("Reset counter for component?") is a query about whether the counter associated with the component identified in the component information 502 should be reset. The component information 502 includes textual information that identifies a component (Transfer Roller) of the image processing device 100. The reset radio button 503 is an interface element enabling a user to reset the counter for the Transfer Roller by selecting the reset radio button 503 and then the apply button 505. The keep-value radio button 504 is an interface element enabling a user to maintain a count value associated with the counter for the Transfer Roller by selecting the keep-value radio button 504 and then the apply button 505. Only one of the reset radio button 503 and the keep-value radio button 504 may be selected at a time. In some embodiments, the apply button 505 is presented as disabled until a selection of the reset radio button 503 or the keep-value radio button 504 is made. The apply button 505 is an interface element enabling a user to trigger processing corresponding to the selected radio button by selecting the apply button 505.

FIG. 6A illustrates another example GUI on the display 201 of the image processing device 100. At least a transfer roller and a photosensitive drum are installed on the image processing device 100, the processing described with respect to steps S301 to S307 is performed and, in response to determining that the counter associated with the transfer roller and the counter associated with the photosensitive drum have not been reset, the image processing device 100 presents the GUI screen shown at FIG. 6A.

In FIG. 6A, a message 601, component information 602, a reset button 603, a keep-value button 604, component information 605, a reset button 606, and a keep-value button 607 are presented on the display 201. The message 601 is textual information to prompt a user to provide user inputs. The text of the message 601 ("Reset counter for component?") is a query about whether each respective counter associated with the component identified in the component information 602 and the component identified in the component information 605 should be reset. The component information 602 includes textual information that identifies a component (Transfer Roller) of the image processing device 100. The component information 605 includes textual information that identifies a component (Photosensitive Drum) of the image processing device 100. The reset button 603 is an interface element enabling a user to reset the counter for the Transfer Roller by selecting the reset button 603. The keep-value button 604 is an interface element enabling a user to maintain a count value associated with the counter for the Transfer Roller by selecting the keep-value button 604. The reset button 606 is an interface element enabling a user to reset the counter for the Photosensitive Drum by selecting the reset button 606. The keep-value button 607 is an interface element enabling a user to maintain a count value associated with the counter for the Photosensitive Drum by selecting the keep-value button 607. As shown in FIG. 6A, interface elements associated with the Transfer Roller (for example, the reset button 603 and the keep-value button 604) and interface elements associated with the Photosensitive Drum (for example, the reset button 606 and the keep-value button 607) are simultaneously presented in the GUI on the display 201.

FIG. 7A illustrates another example GUI on the display 201 of the image processing device 100. At least a transfer roller and a photosensitive drum are installed on the image processing device 100, the processing described with respect to steps S301 to S307 is performed and, in response to determining that the counter associated with the transfer roller and the counter associated with the photosensitive drum have not been reset, the image processing device 100 presents the GUI screen shown at FIG. 7A.

In FIG. 7A, a message 701, component information 702, a reset radio button 703, a keep-value radio button 704, component information 705, a reset radio button 706, a keep-value radio button 707, and an apply button 708 are presented on the display 201. The message 701 is textual information to prompt a user to provide user inputs. The text of the message 701 ("Reset counter for component?") is a query about whether each respective counter associated with the component identified in the component information 702 and the component identified in the component information 705 should be reset. The component information 702 includes textual information that identifies a component (Transfer Roller) of the image processing device 100. The component information 705 includes textual information that identifies a component (Photosensitive Drum) of the image processing device 100. The reset radio button 703 is an interface element enabling a user to reset the counter for the Transfer Roller by selecting the reset radio button 703 and then the apply button 708. The keep-value radio button 704 is an interface element enabling a user to maintain a count value associated with the counter for the Transfer Roller by selecting the keep-value radio button 704 and then the apply button 708. Only one of the reset radio button 703 and the keep-value radio button 704 may be selected at a time. The reset radio button 706 is an interface element enabling a user to reset the counter for the Photosensitive Drum by selecting the reset radio button 706 and then the apply button 708. The keep-value radio button 707 is an interface element enabling a user to maintain a count value associated with the counter for the Photosensitive Drum by selecting the keep-value radio button 707 and then the apply button 708. Only one of the reset radio button 706 and the keep-value radio button 707 may be selected at a time. In some embodiments, the apply button 708 is presented as disabled until a selection of the reset radio button 703 or the keep-value radio button 704 is made and a selection of the reset radio button 706 or the keep-value radio button 707 is made. The apply button 708 is an interface element enabling a user to trigger processing corresponding to the selected radio buttons by selecting the apply button 708. As shown in FIG. 7A, interface elements associated with the Transfer Roller (for example, the reset radio button 703 and the keep-value radio button 704) and interface elements associated with the Photosensitive Drum (for example, the reset radio button 706 and the keep-value radio button 707) are simultaneously presented in the GUI on the display 201.

Figures 8A, 8B:
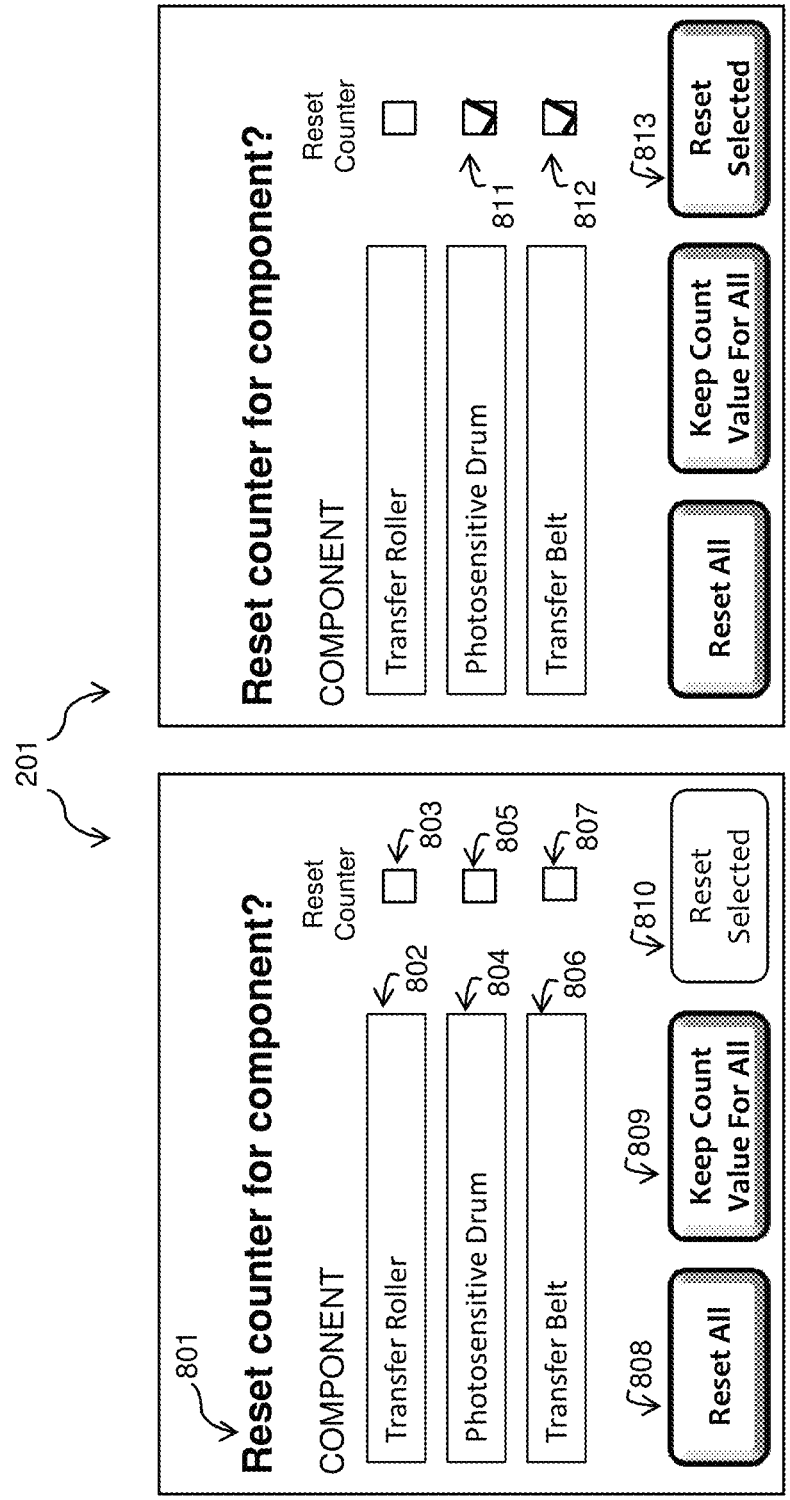
FIGS. 8A and 8B illustrate an example graphical user interface on a display of an image processing device.

FIG. 8A illustrates another example GUI on the display 201 of the image processing device 100. At least a transfer roller, a photosensitive drum, and a transfer belt are installed on the image processing device 100, the processing described with respect to steps S301 to S307 is performed and, in response to determining that the counter associated with the transfer roller, the counter associated with the photosensitive drum, and the counter associated with the transfer belt have not been reset, the image processing device 100 presents the GUI screen shown at FIG. 8A.

In FIG. 8A, a message 801, component information 802, a reset checkbox 803, component information 804, a reset checkbox 805, component information 806, a reset checkbox 807, a reset-all button 808, a keep-value-for-all button 809, and a reset-selected button 810 are presented on the display 201. The message 801 is textual information to prompt a user to provide one or more user inputs. The text of the message 801 ("Reset counter for component?") is a query about whether each respective counter associated with the component identified in the component information 802, the component identified in the component information 804, and the component identified in the component information 806 should be reset. The component information 802 includes textual information that identifies a component (Transfer Roller) of the image processing device 100. The component information 804 includes textual information that identifies a component (Photosensitive Drum) of the image processing device 100. The component information 806 includes textual information that identifies a component (Transfer Belt) of the image processing device 100. The reset checkbox 803 is an interface element enabling a user to reset the counter for the Transfer Roller by selecting the reset checkbox 803 and then the reset-selected button 810. The reset checkbox 805 is an interface element enabling a user to reset the counter for the Photosensitive Drum by selecting the reset checkbox 805 and then the reset-selected button 810. The reset checkbox 807 is an interface element enabling a user to reset the counter for the Transfer Belt by selecting the reset checkbox 807 and then the reset-selected button 810. The reset-all button 808 is an interface element enabling a user to reset each respective counter for the Transfer Roller, the Photosensitive Drum, and the Transfer Belt by selecting the reset-all button 808 without the need to select any of the reset checkbox 803, the reset checkbox 805, and the reset checkbox 807. The keep-value-for-all button 809 is an interface element enabling a user to maintain a count value associated with each respective counter for the Transfer Roller, the Photosensitive Drum, and the Transfer Belt by selecting the keep-value-for-all button 809. None, one, or a combination of the reset checkbox 803, the reset checkbox 805, and the reset checkbox 807 may be selected at a time. In some embodiments, the reset-selected button 810 is presented as disabled until a selection of at least one of the reset checkbox 803, the reset checkbox 805, and the reset checkbox 807 is made. The reset-selected button 810 is an interface element enabling a user to reset each respective counter for the component(s) corresponding to the selected checkbox(s) by selecting the reset-selected button 810. As shown in FIG. 8A, interface elements associated with the Transfer Roller (for example, the reset checkbox 803), interface elements associated with the Photosensitive Drum (for example, the reset checkbox 805), and interface elements associated with the Transfer Belt (for example, the reset checkbox 807) are simultaneously presented in the GUI on the display 201.

In step S309, the image processing device 100 receives one or more user inputs to one or more of the interface elements presented in the GUI on the display 201 of the image processing device 100. A user may select an interface element by providing a user input to the interface element. In some embodiments, the display 201 may be touch sensitive and a user may provide a user input to an interface element by touching a portion of the display 201 where the interface element is presented. The user may touch the display 201 with a finger, stylus, or other tool. Alternatively or additionally, a mouse, a keyboard, or other input device may be used to position a cursor or other indicator over an interface element and then provide a user input to the interface element. Step S309 is described further with reference to the example GUI screens described with respect to step S308.

Referring to FIG. 4, the image processing device 100 may receive a user input to the reset button 403 or the keep-value button 404 presented in the GUI on the display 201. For example, in order to reset the counter for the Transfer Roller, a user may select the reset button 403 by providing a user input to the reset button 403.

Referring to FIGS. 5A and 5B, the image processing device 100 may receive a user input to the reset radio button 503, the keep-value radio button 504, or the apply button 505 presented in the GUI on the display 201. For example, in order to reset the counter for the Transfer Roller, a user may select the reset radio button 503 and the apply button 505 by providing user inputs to the reset radio button 503 and then the apply button 505. When the reset radio button 503 is selected, the image processing device 100 presents a selected reset radio button 506 including a dot or other indicator that designates the selected reset radio button 506 as a selected interface element, as shown in FIG. 5B. In some embodiments, the apply button 505 is presented as disabled until a selection of the reset radio button 503 or the keep-value radio button 504 is made. When the reset radio button 503 is selected, in addition to presenting the selected reset radio button 506, the image processing device 100 may present an enabled apply button 507 including one or more features that designate the enabled apply button 507 as an enabled interface element, as shown in FIG. 5B. A user may then select the enabled apply button 507 by providing a user input to the enabled apply button 507.

Referring to FIGS. 6A and 6B, the image processing device 100 may receive a user input to the reset button 603, the keep-value button 604, the reset button 606, or the keep-value button 607 presented in the GUI on the display 201. For example, in order to reset the counter for the Photosensitive Drum, a user may select the reset button 606 by providing a user input to the reset button 606. When the reset button 606 is selected, the image processing device 100 resets the counter associated with the Photosensitive Drum and removes the component information 605, the reset button 606, and the keep-value button 607 from the GUI, as shown in FIG. 6B. Then, in order to reset the counter for the Transfer Roller, a user may select the reset button 603 by providing a user input to the reset button 603.

Referring to FIGS. 7A and 7B, the image processing device 100 may receive a user input to the reset radio button 703, the keep-value radio button 704, the reset radio button 706, the keep-value radio button 707, or the apply button 708 presented in the GUI on the display 201. For example, in order to maintain a count value associated with the counter for the Transfer Roller and reset the counter for the Photosensitive Drum, a user may select the keep-value radio button 704, the reset radio button 706, and the apply button 708 by providing user inputs to the keep-value radio button 704 and the reset radio button 706, and then the apply button 708. When the keep-value radio button 704 is selected, the image processing device 100 presents a selected keep-value radio button 709 including a dot or other indicator that designates the selected keep-value radio button 709 as a selected interface element, as shown in FIG. 7B. Also, when the reset radio button 706 is selected, the image processing device 100 presents a selected reset radio button 710 including a dot or other indicator that designates the selected reset radio button 710 as a selected interface element, as shown in FIG. 7B. In some embodiments, the apply button 708 is presented as disabled until a selection of the reset radio button 703 or the keep-value radio button 704 is made and a selection of the reset radio button 706 or the keep-value radio button 707 is made. When the keep-value radio button 704 and the reset radio button 706 are selected, in addition to presenting the selected keep-value radio button 709 and the selected reset radio button 710, the image processing device 100 may present an enabled apply button 711 including one or more features that designate the enabled apply button 711 as an enabled interface element, as shown in FIG. 7B. A user may then select the enabled apply button 711 by providing a user input to the enabled apply button 711.

Referring to FIGS. 8A and 8B, the image processing device 100 may receive a user input to the reset checkbox 803, the reset checkbox 805, the reset checkbox 807, the reset-all button 808, the keep-value-for-all button 809, or the reset-selected button 810 presented in the GUI on the display 201. For example, in order to reset each respective counter for the Transfer Roller, the Photosensitive Drum, and the Transfer Belt, a user may select the reset-all button 808 by providing a user input to the reset-all button 808. Further by way of example, in order to maintain a count value associated with each respective counter for the Transfer Roller, the Photosensitive Drum, and the Transfer Belt, a user may select the keep-value-for-all button 809 by providing a user input to the keep-value-for-all button 809. Further by way of example, in order to maintain a count value associated with the counter for the Transfer Roller, reset the counter for the Photosensitive Drum, and reset the counter for the Transfer Belt, a user may select the reset checkbox 805, the reset checkbox 807, and the reset-selected button 810 by providing user inputs to the reset checkbox 805 and the reset checkbox 807, and then the reset-selected button 810. When the reset checkbox 805 is selected, the image processing device 100 presents a selected reset checkbox 811 including a check mark or other indicator that designates the selected reset checkbox 811 as a selected interface element, as shown in FIG. 8B. Also, when the reset checkbox 807 is selected, the image processing device 100 presents a selected reset checkbox 812 including a check mark or other indicator that designates the selected reset checkbox 812 as a selected interface element, as shown in FIG. 8B. In some embodiments, the reset-selected button 810 is presented as disabled until a selection of at least one of the reset checkbox 803, the reset checkbox 805, and the reset checkbox 807 is made. When the reset checkbox 805 and the reset checkbox 807 are selected, in addition to presenting the selected reset checkbox 811 and the selected reset checkbox 812, the image processing device 100 may present an enabled reset-selected button 813 including one or more features that designate the enabled reset-selected button 813 as an enabled interface element, as shown in FIG. 8B. A user may then select the enabled reset-selected button 813 by providing a user input to the enabled reset-selected button 813.

In step S310, the image processing device 100 performs one or more operations based on the one or more user inputs received in step S309.

In some embodiments, in response to receiving the one or more user inputs in step S309, the image processing device 100 resets a counter associated with a component. The counter may store a value representing the number of times the component associated with the counter has operated. To reset the counter, the image processing device 100 may set the stored value to zero.

In some embodiments, in response to receiving the one or more user inputs in step S309, the image processing device 100 transitions from an operation mode for performing component removal and component installation on the image processing device 100 to a different operation mode without resetting a counter that was determined in step S307 not to have been reset. The different operation mode may be the standard or default operation mode for the image processing device 100, and may be a mode of operation for utilizing features of the image processing device 100 such as printing, copying, or scanning. The operation mode for performing component removal and component installation may be a service mode such as described above with respect to step S301.

Step S310 is described further with reference to the example GUI screens described with respect to steps S308 and S309. Referring to FIG. 4, in some embodiments, the image processing device 100 performs one or more operations based on a user input to the reset button 403. For example, in response to receiving the user input to the reset button 403, the image processing device 100 may reset a counter associated with the Transfer Roller.

In some embodiments, the image processing 100 performs one or more operations based on a user input to the keep-value button 404. For example, in response to receiving the user input to the keep-value button 404, the image processing device 100 may transition from an operation mode for performing component removal and component installation on the image processing device 100 to a different operation mode without resetting a counter associated with the Transfer Roller. By way of example, the image processing device 100 may, without resetting the counter associated with the Transfer Roller, switch from a service mode to a standard or default operation mode for utilizing features of the image processing device 100 such as printing, copying, or scanning.

Referring to FIGS. 5A and 5B, in some embodiments, the image processing device 100 performs one or more operations based on user inputs to the reset radio button 503 and the apply button 505. For example, when the reset radio button 503 is selected, the image processing device 100 may present a selected reset radio button 506 including a dot or other indicator that designates the selected reset radio button 506 as a selected interface element, as shown in FIG. 5B. In some embodiments, the apply button 505 is presented as disabled until a selection of the reset radio button 503 or the keep-value radio button 504 is made. When the reset radio button 503 is selected, in addition to presenting the selected reset radio button 506, the image processing device 100 may present an enabled apply button 507 including one or more features that designate the enabled apply button 507 as an enabled interface element, as shown in FIG. 5B. Then, in response to receiving a user input to the enabled apply button 507, the image processing device 100 may reset a counter associated with the Transfer Roller.

In some embodiments, the image processing device 100 performs one or more operations based on user inputs to the keep-value radio button 504 and the apply button 505. For example, when the keep-value radio button 504 is selected, the image processing device 100 may present a selected keep-value radio button including a dot or other indicator that designates the selected keep-value radio button as a selected interface element. In some embodiments, the apply button 505 is presented as disabled until a selection of the reset radio button 503 or the keep-value radio button 504 is made. When the keep-value radio button 504 is selected, in addition to presenting the selected keep-value radio button, the image processing device 100 may present an enabled apply button 507 including one or more features that designate the enabled apply button 507 as an enabled interface element. Then, in response to receiving a user input to the enabled apply button 507, the image processing device 100 may transition from an operation mode for performing component removal and component installation on the image processing device 100 to a different operation mode without resetting a counter associated with the Transfer Roller. By way of example, the image processing device 100 may, without resetting the counter associated with the Transfer Roller, switch from a service mode to a standard or default operation mode for utilizing features of the image processing device 100 such as printing, copying, or scanning.

Referring to FIGS. 6A and 6B, in some embodiments, the image processing device 100 performs one or more operations based on a user input to one or more of the reset button 603, the keep-value button 604, the reset button 606, and the keep-value button 607. For example, in response to receiving a user input to the reset button 606, the image processing device 100 may reset a counter associated with the Photosensitive Drum. Then, the image processing device 100 may remove the component information 605, the reset button 606, and the keep-value button 607 from the GUI, as shown in FIG. 6B. Then, by way of example, the image processing device 100 may perform one or more operations based on a user input to the reset button 603 or the keep-value button 604. For example, in response to receiving a user input to the reset button 603, the image processing device 100 may reset a counter associated with the Transfer Roller.

Referring again to FIG. 6A, by way of example, in response to receiving a user input to the keep-value button 607, the image processing device 100 may remove the component information 605, the reset button 606, and the keep-value button 607 from the GUI, as shown in FIG. 6B, without resetting the counter associated with the Photosensitive Drum. Then, by way of example, the image processing device 100 may perform one or more operations based on a user input to the reset button 603 or the keep-value button 604. For example, in response to receiving a user input to the keep-value button 604, the image processing device 100 may transition from an operation mode for performing component removal and component installation on the image processing device 100 to a different operation mode without resetting a counter associated with the Transfer Roller. By way of example, the image processing device 100 may, without resetting the counter associated with the Transfer Roller, switch from a service mode to a standard or default operation mode for utilizing features of the image processing device 100 such as printing, copying, or scanning.

Referring to FIGS. 7A and 7B, in some embodiments, the image processing device 100 performs one or more operations based on a user input to one or more of the reset radio button 703, the keep-value radio button 704, the reset radio button 706, the keep-value radio button 707, and the apply button 708. For example, when the keep-value radio button 704 is selected, the image processing device 100 may present a selected keep-value radio button 709 including a dot or other indicator that designates the selected keep-value radio button 709 as a selected interface element, as shown in FIG. 7B. Also, when the reset radio button 706 is selected, the image processing device 100 may present a selected reset radio button 710 including a dot or other indicator that designates the selected reset radio button 710 as a selected interface element, as shown in FIG. 7B. In some embodiments, the apply button 708 is presented as disabled until a selection of the reset radio button 703 or the keep-value radio button 704 is made and a selection of the reset radio button 706 or the keep-value radio button 707 is made. When the keep-value radio button 704 and the reset radio button 706 are selected, in addition to presenting the selected keep-value radio button 709 and the selected reset radio button 710, the image processing device 100 may present an enabled apply button 711 including one or more features that designate the enabled apply button 711 as an enabled interface element, as shown in FIG. 7B. Then, in response to receiving a user input to the enabled apply button 711, the image processing device 100 may reset a counter associated with the Photosensitive Drum and transition from an operation mode for performing component removal and component installation on the image processing device 100 to a different operation mode without resetting a counter associated with the Transfer Roller. By way of example, the image processing device 100 may reset a counter associated with the Photosensitive Drum and, without resetting the counter associated with the Transfer Roller, switch from a service mode to a standard or default operation mode for utilizing features of the image processing device 100 such as printing, copying, or scanning.

Referring again to FIG. 7A, further by way of example, different user selections could be made and one or more operations based on the user selections may be performed. For example, the reset radio button 703 and the reset radio button 706 may be selected; then the apply button 708 (which may be presented as the enabled apply button 711, as shown in FIG. 7B) may be selected and the image processing device 100 may reset the counter associated with the Transfer Roller and the Photosensitive Drum. In another example, the keep-value radio button 704 and the keep-value radio button 707 may be selected; then the apply button 708 (which may be presented as the enabled apply button 711, as shown in FIG. 7B) may be selected and the image processing device 100 may transition from an operation mode for performing component removal and component installation on the image processing device 100 to a different operation mode without resetting a counter associated with the Transfer Roller and without resetting a counter associated with the Photosensitive Drum. By way of example, the image processing device 100 may, without resetting the counters associated with the Transfer Roller and the Photosensitive Drum, switch from a service mode to a standard or default operation mode for utilizing features of the image processing device 100 such as printing, copying, or scanning. In another example, the reset radio button 703 and the keep-value radio button 707 may be selected; then the apply button 708 (which may be presented as the enabled apply button 711, as shown in FIG. 7B) may be selected and the image processing device 100 may reset a counter associated with the Transfer Roller and transition from an operation mode for performing component removal and component installation on the image processing device 100 to a different operation mode without resetting a counter associated with the Photosensitive Drum. By way of example, the image processing device 100 may reset a counter associated with the Transfer Roller and, without resetting the counter associated with the Photosensitive Drum, switch from a service mode to a standard or default operation mode for utilizing features of the image processing device 100 such as printing, copying, or scanning.

Referring to FIGS. 8A and 8B, in some embodiments, the image processing device 100 performs one or more operations based on a user input to one or more of the reset checkbox 803, the reset checkbox 805, the reset checkbox 807, the reset-all button 808, the keep-value-for-all button 809, and the reset-selected button 810.

For example, in response to receiving a user input to the reset-all button 808, the image processing device 100 may reset each respective counter associated with the Transfer Roller, the Photosensitive Drum, and the Transfer Belt.

Further by way of example, in response to receiving a user input to the keep-value-for-all button 809, the image processing device 100 may transition from an operation mode for performing component removal and component installation on the image processing device 100 to a different operation mode without resetting any of the respective counters associated with the Transfer Roller, the Photosensitive Drum, and the Transfer Belt. By way of example, the image processing device 100 may, without resetting the counters associated with the Transfer Roller, the Photosensitive Drum, and the Transfer Belt, switch from a service mode to a standard or default operation mode for utilizing features of the image processing device 100 such as printing, copying, or scanning.

Further by way of example, in response to receiving a user input to one or more of the reset checkbox 803, the reset checkbox 805, and the reset checkbox 807, and then to the reset-selected button 810, one or more operations based on the user selections may be performed. For example, a user may select the reset checkbox 805, the reset checkbox 807, and then the reset-selected button 810 (which may be presented as the enabled reset-selected button 813, as shown in FIG. 8B). When the reset checkbox 805 is selected, the image processing device 100 may present a selected reset checkbox 811 including a check mark or other indicator that designates the selected reset checkbox 811 as a selected interface element, as shown in FIG. 8B. Also, when the reset checkbox 807 is selected, the image processing device 100 may present a selected reset checkbox 812 including a check mark or other indicator that designates the selected reset checkbox 812 as a selected interface element, as shown in FIG. 8B. In some embodiments, the reset-selected button 810 is presented as disabled until a selection of at least one of the reset checkbox 803, the reset checkbox 805, and the reset checkbox 807 is made. When the reset checkbox 805 and the reset checkbox 807 are selected, in addition to presenting the selected reset checkbox 811 and the selected reset checkbox 812, the image processing device 100 may present the enabled reset-selected button 813 including one or more features that designate the enabled reset-selected button 813 as an enabled interface element, as shown in FIG. 8B. Then, in response to receiving a user input to the enabled reset-selected button 813, the image processing device 100 may reset a counter associated with the Photosensitive Drum and the Transfer Belt, and transition from an operation mode for performing component removal and component installation on the image processing device 100 to a different operation mode without resetting a counter associated with the Transfer Roller. By way of example, the image processing device 100 may reset a counter associated with the Photosensitive Drum and the Transfer Belt and, without resetting the counter associated with the Transfer Roller, switch from a service mode to a standard or default operation mode for utilizing features of the image processing device 100 such as printing, copying, or scanning.

Referring again to FIG. 8A, further by way of example, different user selections could be made and one or more operations based on the user selections may be performed. For example, a different combination of the reset checkbox 803, the reset checkbox 805, and the reset checkbox 807 could be selected and the image processing device 100 would, in response to a selection of the enabled reset-selected button 813, reset one or more counters in accordance with the selected checkboxes.

After the image processing device 100 performs the one or more operations in step S310, the process ends.

Various above-described operations may be executed and/or controlled by one or more applications running on the image processing device 100. The above description serves to explain principles of the invention; but the invention should not be limited to the examples described above. For example, the order and/or timing of some of the various operations may vary from the examples given above without departing from the scope of the invention. Further by way of example, the type of image processing device may vary from the examples given above without departing from the scope of the invention. Other variations from the above-recited examples may also exist without departing from the scope of the invention.

The scope of the present invention includes a computer-readable medium storing instructions that, when executed by one or more processors, cause the one or more processors to perform one or more embodiments of the invention described herein. The scope of the present invention includes a computer-readable medium storing instructions that, when executed by one or more processors, cause the image processing device 100 to perform one or more embodiments of the invention described herein.

Examples of a computer-readable medium include a floppy disk, a hard disk, a magneto-optical disc (MO), a compact-disc read-only memory (CD-ROM), a compact disc recordable (CD-R), a CD-Rewritable (CD-RW), a digital versatile disc ROM (DVD-ROM), a DVD-RAM, a DVD-RW, a DVD+RW, magnetic tape, a nonvolatile memory card, and a ROM. Computer-executable instructions can also be supplied to the computer-readable medium by being downloaded via a network.

While the present invention has been described with reference to exemplary embodiments, it is to be understood that the invention is not limited to the disclosed exemplary embodiments.

What is claimed is:

1. A method comprising:
receiving information indicating a component of an image processing device has been installed on the image processing device;
storing status information associated with the component, the status information indicating the component has been installed on the image processing device;
receiving information indicating occurrence of an event which causes the image processing device to transition out of a service mode, the service mode comprising an operation mode for performing maintenance work on the image processing device;
in response to receiving the information indicating the occurrence of the event, performing a search to identify installed components, and identifying the component based on the status information;
identifying a counter associated with the component;
determining whether the counter has been reset; and
in response to determining that the counter has not been reset, presenting an interface element in a graphical user interface on a display of the image processing device, the interface element enabling a user to reset the counter by selecting the interface element.

2. The method of claim 1, wherein receiving the information indicating the component of the image processing device has been installed on the image processing device comprises receiving information based on a sensor of the image processing device detecting that the component has been installed on the image processing device.

3. The method of claim 1, wherein storing status information associated with the component comprises setting a flag associated with the component, and
wherein identifying the component based on the status information comprises identifying the component based on the flag associated with the component.

4. The method of claim 1, further comprising:
receiving a user input via the graphical user interface while the interface element is presented; and
in response to receiving the user input, switching from the service mode to an operation mode different from the service mode based on the occurrence of the event.

5. The method of claim 1, further comprising:
receiving a user input to the interface element; and
in response to receiving the user input, resetting the counter.

6. The method of claim 1, further comprising:
in response to determining that the counter has not been reset, presenting a message in connection with the interface element, the message comprising a query about whether the counter associated with the component should be reset.

7. The method of claim 1, further comprising:
in response to determining that the counter has not been reset, presenting a second interface element in the graphical user interface, the second interface element enabling the user to maintain a count value associated with the counter by selecting the second interface element.

8. The method of claim 7, further comprising:
receiving a user input to the second interface element; and
in response to receiving the user input, switching from the service mode to an operation mode different from the service mode without resetting the counter.

9. The method of claim 1, further comprising:
receiving second information indicating a second component of the image processing device has been installed on the image processing device;
storing second status information associated with the second component, the second status information indicating the second component has been installed on the image processing device;
in response to receiving the information indicating the occurrence of the event, identifying the second component based on the second status information;
identifying a second counter associated with the second component;
determining whether the second counter has been reset; and
in response to determining that the second counter has not been reset, presenting a second interface element in the graphical user interface, the second interface element enabling the user to reset the second counter by selecting the second interface element,
wherein the interface element and the second interface element are simultaneously presented in the graphical user interface.

10. A non-transitory computer-readable medium storing instructions that, when executed by one or more processors, cause the one or more processors to perform operations comprising:
    receiving information indicating a component of an image processing device has been installed on the image processing device;
    storing status information associated with the component, the status information indicating the component has been installed on the image processing device;
    receiving information indicating occurrence of an event which causes the image processing device to transition out of a service mode, the service mode comprising an operation mode for performing maintenance work on the image processing device;
    in response to receiving the information indicating the occurrence of the event, performing a search to identify installed components, and identifying the component based on the status information;
    identifying a counter associated with the component;
    determining whether the counter has been reset; and
    in response to determining that the counter has not been reset, presenting an interface element in a graphical user interface on a display of the image processing device, the interface element enabling a user to reset the counter by selecting the interface element.

11. The non-transitory computer-readable medium of claim 10, the operations further comprising:
    receiving a user input via the graphical user interface while the interface element is presented; and
    in response to receiving the user input, switching from the service mode to an operation mode different from the service mode based on the occurrence of the event.

12. A system comprising:
    one or more processors; and
    one or more computer-readable media coupled to the one or more processors, the one or more computer-readable media storing instructions that, when executed by the one or more processors, cause the one or more processors to perform operations comprising:
        receiving information indicating a component of an image processing device has been installed on the image processing device;
        storing status information associated with the component, the status information indicating the component has been installed on the image processing device;
        receiving information indicating occurrence of an event which causes the image processing device to transition out of a service mode, the service mode comprising an operation mode for performing maintenance work on the image processing device;
        in response to receiving the information indicating the occurrence of the event, performing a search to identify installed components, and identifying the component based on the status information;
        identifying a counter associated with the component;
        determining whether the counter has been reset; and
        in response to determining that the counter has not been reset, presenting an interface element in a graphical user interface on a display of the image processing device, the interface element enabling a user to reset the counter by selecting the interface element.

13. The system of claim 12, wherein receiving the information indicating the component of the image processing device has been installed on the image processing device comprises receiving information based on a sensor of the image processing device detecting that the component has been installed on the image processing device.

14. The system of claim 12, wherein storing status information associated with the component comprises setting a flag associated with the component, and
    wherein identifying the component based on the status information comprises identifying the component based on the flag associated with the component.

15. The system of claim 12, the operations further comprising:
    receiving a user input via the graphical user interface while the interface element is presented; and
    in response to receiving the user input, switching from the service mode to an operation mode different from the service mode based on the occurrence of the event.

16. The system of claim 12, the operations further comprising:
    receiving a user input to the interface element; and
    in response to receiving the user input, resetting the counter.

17. The system of claim 12, the operations further comprising:
    in response to determining that the counter has not been reset, presenting a message in connection with the interface element, the message comprising a query about whether the counter associated with the component should be reset.

18. The system of claim 12, the operations further comprising:
    in response to determining that the counter has not been reset, presenting a second interface element in the graphical user interface, the second interface element enabling the user to maintain a count value associated with the counter by selecting the second interface element.

19. The system of claim 18, the operations further comprising:
    receiving a user input to the second interface element; and
    in response to receiving the user input, switching from the service mode to an operation mode different from the service mode without resetting the counter.

20. The system of claim 12, the operations further comprising:
    receiving second information indicating a second component of the image processing device has been installed on the image processing device;
    storing second status information associated with the second component, the second status information indicating the second component has been installed on the image processing device;
    in response to receiving the information indicating the occurrence of the event, identifying the second component based on the second status information;
    identifying a second counter associated with the second component;
    determining whether the second counter has been reset; and
    in response to determining that the second counter has not been reset, presenting a second interface element in the graphical user interface, the second interface element enabling the user to reset the second counter by selecting the second interface element,
    wherein the interface element and the second interface element are simultaneously presented in the graphical user interface.

* * * * *